(12) United States Patent
Humla et al.

(10) Patent No.: US 11,490,330 B2
(45) Date of Patent: Nov. 1, 2022

(54) METHOD AND POWER CONTROL UNIT FOR SUPPLYING ELECTRIC POWER TO A RADIO UNIT

(71) Applicant: Telefonaktiebolaget LM Ericsson (publ), Stockholm (SE)

(72) Inventors: Lars Humla, Järfälla (SE); Lackis Eleftheriadis, Gävle (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 157 days.

(21) Appl. No.: 16/618,430

(22) PCT Filed: Jun. 2, 2017

(86) PCT No.: PCT/SE2017/050590
§ 371 (c)(1),
(2) Date: Dec. 2, 2019

(87) PCT Pub. No.: WO2018/222098
PCT Pub. Date: Dec. 6, 2018

(65) Prior Publication Data
US 2020/0120595 A1   Apr. 16, 2020

(51) Int. Cl.
*H04W 52/02* (2009.01)
*G05F 1/66* (2006.01)
(Continued)

(52) U.S. Cl.
CPC ......... *H04W 52/0203* (2013.01); *G05F 1/66* (2013.01); *H02J 7/34* (2013.01); *H04W 52/0216* (2013.01); *H04W 52/386* (2013.01)

(58) Field of Classification Search
CPC .. H04B 17/102; G01R 31/385; G01R 31/396; G05B 13/048; G05F 1/66; H02J 7/0003;
(Continued)

(56) References Cited

U.S. PATENT DOCUMENTS 10,281,939 B2 * 5/2019 Chamberlain ......... H04W 4/80
2011/0077059 A1   3/2011 Kim et al.
(Continued)

FOREIGN PATENT DOCUMENTS

CN    103944255 A   7/2014
CN    105472786 A   4/2016
(Continued)

OTHER PUBLICATIONS

Extended European Search Report for European Patent Application No. 17911428.5, dated Oct. 28, 2020, 8 pages.
(Continued)

*Primary Examiner* — Marsha D Banks Harold
*Assistant Examiner* — Dharmesh J Patel
(74) *Attorney, Agent, or Firm* — Withrow & Terranova, PLLC

(57) ABSTRACT

A method and power control unit for supplying electric power to a first radio unit of a network node in a wireless network. The power control unit obtains a scheduled power demand related to an amount of electric power required in the first radio unit for transmissions scheduled in an imminent time interval such as a resource block or subframe. Then, electric power is supplied to the first radio unit from a power supply unit if the power demand does not exceed a power threshold, or from the power supply unit and a supplementary power source if the power demand exceeds the power threshold. The supplementary power source may comprise a battery that can be connected or disconnected for successive time intervals depending on the scheduled power demand which may fluctuate greatly depending on the first radio unit's transmissions.

19 Claims, 5 Drawing Sheets

(51) Int. Cl.
*H02J 7/34* (2006.01)
*H04W 52/38* (2009.01)

(58) Field of Classification Search
CPC ...... H02J 7/0013; H02J 7/0014; H02J 7/0019;
H02J 7/22; H02J 7/34; H02J 7/0048;
H02J 9/00; H02J 9/061; H02J 9/062;
H02J 13/00017; H02J 13/00026; H04W
24/04; H04W 52/0203; H04W 52/0216;
H04W 52/386; Y04S 20/12
See application file for complete search history.

(56) References Cited

U.S. PATENT DOCUMENTS

| 2011/0227414 | A1* | 9/2011 | Fischer | H02J 7/0048 |
| | | | | 307/66 |
| 2012/0289224 | A1 | 11/2012 | Hallberg et al. | |
| 2015/0234399 | A1 | 8/2015 | Chamberlain et al. | |
| 2016/0088571 | A1 | 3/2016 | Choi et al. | |

FOREIGN PATENT DOCUMENTS

| DE | 102010042030 A1 | 10/2011 |
| WO | 2017095279 A1 | 6/2017 |

OTHER PUBLICATIONS

International Search Report and Written Opinion for International Patent Application No. PCT/SE2017/050590, dated Mar. 27, 2018, 13 pages.
First Office Action for Chinese Patent Application No. 201780091369.X, dated Nov. 26, 2021, 15 pages.
Extended European Search Report for European Patent Application No. 21210357.6, dated Feb. 23, 2022, 7 pages.

* cited by examiner

METHOD AND POWER CONTROL UNIT FOR SUPPLYING ELECTRIC POWER TO A RADIO UNIT

This application is a 35 U.S.C. § 371 national phase filing of International Application No. PCT/SE2017/050590, filed Jun. 2, 2017, the disclosure of which is incorporated herein by reference in its entirety.

TECHNICAL FIELD

The present disclosure relates generally to a method and a power control unit, for supplying electric power to a first radio unit of a network node in a wireless network, so the first radio unit can transmit radio signals to wireless devices.

BACKGROUND

In the field of wireless communication, network nodes of a wireless network typically comprise one or more radio units from which radio signals are transmitted to be received by various wireless devices. This transmission requires supply of electric power which is conventionally accomplished by means of a power supply unit that may serve a number of radio units of a network node. One or more radio units are typically arranged on top of a tower while the power supply unit is arranged at the bottom. If the tower height is substantial, this means that the distance between the power supply unit and the radio units is correspondingly large and the cables used for feeding the electric power up to the radio units must also be of substantial length so that energy dissipates from the cable in the form of heat.

As new radio technologies and systems are introduced in wireless networks to meet the ever growing demands for wireless services, the power consumption of radio units will also increase rapidly. Implementation of new features and functions and improvements on hardware components of the radio units will enable increasing amounts of wireless devices to be served and with higher data rates. As a result, the power consumption of radio units will also increase and more efficient technologies and equipment are not enough to reduce the overall power consumption, which in turn requires high capacity of the power supply unit and its power feeding cables connected to the radio units.

In new technologies and networks, e.g. for the fifth Generation "5G" and New Radio "NR", more antennas will typically be added on radio heads within the radio units which will further increase the power consumption per radio unit. Today, the capacity of the power supply unit and the power feeding cables must be dimensioned for the highest power consumption that occurs over time, referred to as peak power, in order to provide wireless services also when the transmissions are at a maximum. However, the periods when the power consumption is at a maximum are quite short and the power consumption is much lower most of the time such that the capacity of the power supply unit is rarely utilized.

SUMMARY

It is an object of embodiments described herein to address at least some of the problems and issues outlined above. It is possible to achieve this object and others by using a method and a power control unit as defined in the attached independent claims.

According to one aspect, a method is performed by a power control unit for supplying electric power to a first radio unit of a network node in a wireless network. In this method the power control unit obtains a scheduled power demand related to an amount of electric power required in the first radio unit for transmissions scheduled in an imminent time interval, such as a resource block or a subframe. Electric power is supplied to the first radio unit from a power supply unit if the power demand does not exceed a power threshold. Electric power is supplied to the first radio unit from the power supply unit and a supplementary power source if the power demand exceeds the power threshold.

According to another aspect, a power control unit is arranged to supply electric power to a first radio unit of a network node in a wireless network. The power control unit is configured to obtain a scheduled power demand related to an amount of electric power required in the first radio unit for transmissions scheduled in an imminent time interval. The power control unit is further configured to supply electric power from a power supply unit to the first radio unit if the power demand does not exceed a power threshold, and to supply electric power from the power supply unit and a supplementary power source to the first radio unit if the power demand exceeds the power threshold.

It is an advantage in this solution that the power supply unit can be dimensioned with lower capacity than in conventional solutions since as soon as the power demand goes above the power threshold, the supplementary power source adds the extra power needed. Another advantage is that thinner cables can be used between the power supply unit and the first radio unit thanks to the reduced maximum power from the power supply unit, and the energy losses by heat dissipation from the cables is also reduced. The supplementary power source may be a relatively simple battery which can be installed close to the radio unit, e.g. at the top of a tower, using a relatively short cable.

The above method and power control unit may be configured and implemented according to different optional embodiments to accomplish further features and benefits, to be described below.

A computer program is also provided which comprises instructions which, when executed on at least one processor, cause the at least one processor to carry out either of the methods described above. A carrier containing the above computer program is further provided, wherein the carrier is one of an electronic signal, an optical signal, a radio signal, or a computer readable storage medium.

BRIEF DESCRIPTION OF DRAWINGS

The solution will now be described in more detail by means of exemplary embodiments and with reference to the accompanying drawings, in which.

DETAILED DESCRIPTION

Figure 1:
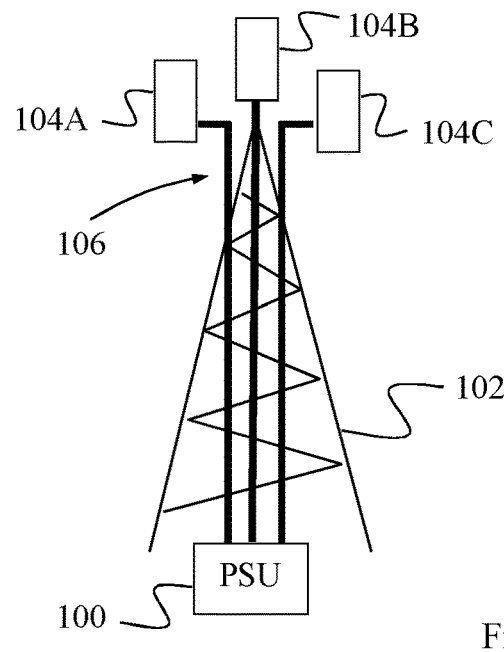
FIG. 1 is a structure view illustrating how electric power is conventionally supplied to a set of radio units of a network node, according to the prior art.

Briefly described, a solution is provided to avoid the necessity of a power supply unit with "over-sized" capacity to cope with peak power occurring only with short duration, meaning that most of the time the full capacity of such a unit is far from utilized, i.e. when the power demand is normally much lower. A power supply unit (PSU) with considerably reduced capacity can be used instead by also employing a supplementary power source at a radio unit, in addition to the power supply unit, if the power demand for that radio unit exceeds a predefined power threshold. As long as the power demand is not above the power threshold, it is sufficient to use only the power supply unit which can thereby be dimensioned with lower capacity than in conventional solutions. Thinner cables can also be used between the power supply unit and the radio units and the energy losses by heat dissipation from the cables can be reduced.

The supplementary power source may be a relatively simple battery which can be installed close to the radio unit, e.g. at the top of a tower. The supplementary power source in this solution may also be called a radio battery unit (RBU) which term is sometimes used below.

In this disclosure, the term "power demand" basically indicates how much electric power is needed in a radio unit for performing transmissions scheduled in an imminent time interval, which may also be referred to as "scheduled power demand". Information about the radio unit's power demand scheduled for an imminent, or next, time interval can be obtained from a scheduling function of the network node which schedules transmissions in radio resource elements of each upcoming time interval. The scheduled power demand can thus be obtained on a dynamic basis per time interval which may be a resource block or a subframe in which transmissions are scheduled to one or more wireless devices. The time interval discussed in this description should be understood as a time interval in which transmissions can be scheduled, which may have a duration in the range of one or more milliseconds or even a fraction of a millisecond, depending on the radio technology used.

This means that the scheduled power demand may change instantly from one time interval to another depending on how the transmissions are scheduled for the radio unit, and the supply of power to the radio unit can be adapted accordingly. In more detail, the supplementary power source can be connected and disconnected to/from the first radio unit depending on whether the power demand for an imminent time interval exceeds the power threshold or not. The power threshold may be set so that it does not exceed an available capacity of the power supply unit.

For example, the scheduled power demand may be dependent on how much transmissions are scheduled, and also on how far away the intended recipients are located from the network node which may be subject to more or less dynamic power regulation. Further, broadcast information is typically transmitted with relatively high power to reach the fringes of a cell, while dedicated data and messages may be transmitted with less power necessary to reach a particular recipient such as a wireless device. It should be noted that the scheduled power demand can be very precise, i.e. not more than needed for performing scheduled transmissions from the radio unit.

FIG. 1 illustrates a conventional arrangement for power supply at a network node where a power supply unit (PSU) 100 is located at the bottom of a tower 102 of substantial height, e.g. to provide radio coverage across one or more macro cells. In this example, three radio units 104A-C are mounted at the top of the tower 102 and electric power is supplied by the PSU 100 to each radio unit 104A-C over respective cables 106 running along the entire height of the tower 102. The cables 106 used for feeding electric power up to the radio units 104A-C are thus of substantial length and they must also be dimensioned thick enough to deliver the highest occurring peak power according to conventional procedures.

As mentioned above, drawbacks of this normally used arrangement include high requirements for capacity of the PSU 100 and dimensioning of the cables 106, resulting in high costs. The PSU 100 thus needs to be dimensioned to provide electric power to all radio units 104A-C for handling power consumption from minimum level to peak power. It is thus a problem that capacity capable of delivering peak power must be obtained in the power supply, while this capacity is used in full only during a fraction of the total time. These drawbacks and problems can be solved or at least reduced as follows.

Figure 2:
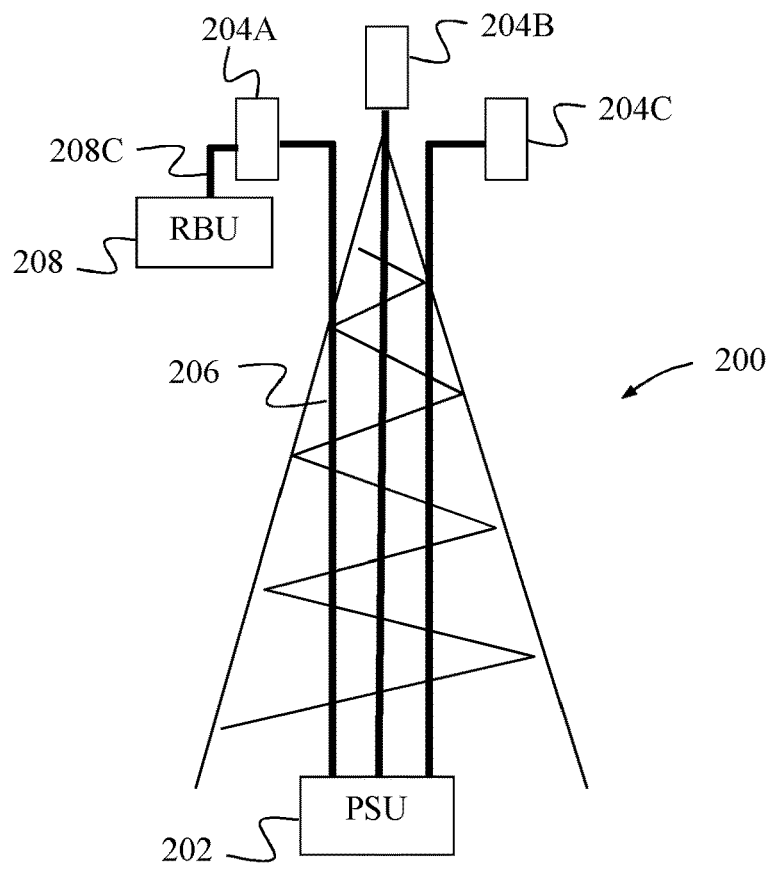
FIG. 2 is a structure view illustrating how the solution may be employed for supplying electric power to a first radio unit in a set of radio units of a network node, according to some example embodiments.

FIG. 2 illustrates an arrangement where the solution is used at a similar network node 200 which likewise employs a PSU 202 for feeding electric power to three radio units 204A-C situated on top of a tower. This arrangement is however different by also employing a supplementary power source RBU 208 located close to the radio unit 204A, in addition to the PSU 202, such that the RBU 208 is connected to the radio unit 204A over a cable 208C only if the scheduled power demand for radio unit 204A exceeds a predefined power threshold. It should be understood that similar supplementary power sources, not shown here, can also be employed for the other radio units 204B and 204C. Thereby, the PSU 202 and a feeding cable 206 to each radio unit can be dimensioned with considerably less capacity and energy losses than in a conventional arrangement.

Figure 3:
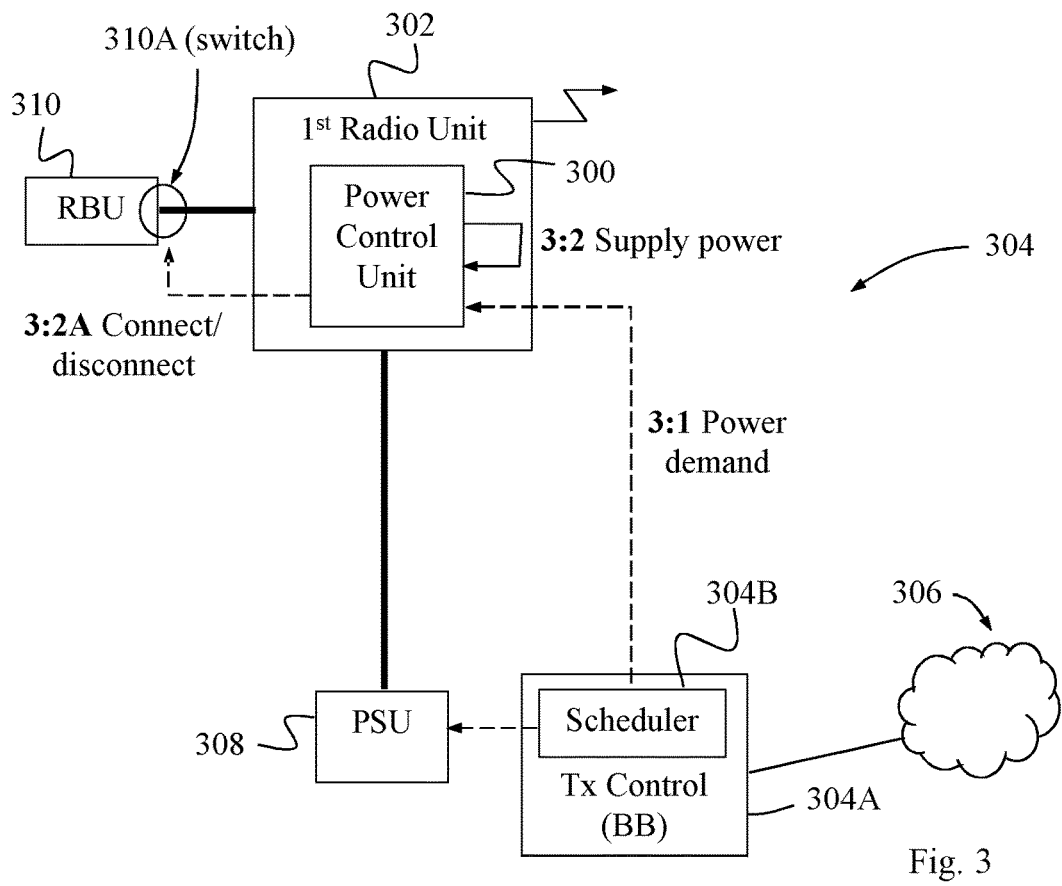
FIG. 3 is a block diagram illustrating an example of how a power control unit may be structured and operate, according to further example embodiments.

FIG. 3 illustrates the arrangement of FIG. 2 in more detail, only showing entities and functions needed for one radio unit, here called a first radio unit 302, of a network node 304. The solution can be realized by functionality in a power control unit 300 which may be arranged within or connected to the first radio unit 302. A PSU 308 remains connected to the first radio unit 302 for supplying electric power more or less on a continuous basis. The PSU 308 may be a site power system or the like supplying power to several radio units and other equipment at the network node. A supplementary power source RBU 310 is further located close to the first radio unit 302 and can be connected and disconnected in manner described below. Such a supplementary power source may be employed at each radio unit of the network node.

The network node 304 further comprises a transmission control function 304A in which a scheduling function 304B, denoted "scheduler" for short, operates to schedule transmissions from the first radio unit 302 on a time interval basis. As mentioned above, the time interval may be a resource block or a subframe in which transmissions can be scheduled. The transmission control function 304A may operate in a base band (BB) according to regular procedures not necessary to describe here since the transmission control as such lies outside the solution. It is also shown that the network node 304 belongs to a wireless network 306.

In this figure, a first action 3:1 illustrates that the power control unit 300 obtains from the scheduler 304B a scheduled power demand for transmissions scheduled in an imminent time interval for the first radio unit 302, as indicated by a dashed arrow to the power control unit 300. Normally, the scheduling function of a network node provides information about a radio unit's scheduled power demand to the PSU of the network node, as illustrated by a dashed arrow to PSU 308, so that the PSU can feed the required amount of power in real time to that radio unit. In this example, the scheduler 304B thus provides this information to the power control unit 300 as well. This action is repeated for every new time interval.

In a next action 3:2, the power control unit 300 makes sure that the required amount of power according to the obtained power demand is supplied to the first radio unit 302, either from the PSU 308 alone if the obtained power demand does not exceed a power threshold, or from both the PSU 308 and the RBU 310 if the obtained power demand exceeds the power threshold. Accordingly, action 3:2 includes an action 3:2A where the power control unit 300 activates or deactivates the RBU 310, by connection and disconnection thereof by means of a switch 310A as indicated by another dashed arrow, to deliver power to the first radio unit 302 whenever the power demand exceeds the power threshold. Hence, actions 3:1 and 3:2-3:2A are repeated for every new time interval which ensures that the required amount of power is supplied to the first radio unit 302 while employing the RBU 310 no more than necessary. During periods when the RBU 310 is not employed, which is likely to be most of the time, the battery therein can be connected to a power supply for charging so as to remain charged at all times. The above-mentioned PSU 308 may be used as the power supply for charging.

By using the above procedure and arrangement, it is an advantage that the demands for capacity in the power supply unit or PSU 308 and its feeding cables are considerably reduced which means that simpler equipment can be used resulting in lower costs. Another advantage is that the activation and deactivation of the supplementary power source RBU 310 is performed in a dynamic manner on a time interval basis, so that the PSU and the RBU are used as efficiently as possible while supplying the correct amount of electric power to the radio unit at all times. Since the PSU is no longer required to deliver peak power by itself, the above procedure and arrangement may be referred to as "time interval based peak power shaving".

An example will now be described, with reference to the flow chart in FIG. 4, of how the solution may be employed in terms of actions which may be performed by the above-mentioned power control unit. Some optional example embodiments that could be used in this procedure will also be described below. Reference will also be made, without limiting the described features and embodiments, to FIG. 3. As indicated above, the wireless network may be of any type with network nodes that transmit radio signals in time intervals such as resource blocks or subframes, and any suitable protocols and standards may be employed in the network.

The power control unit 300 in this procedure is arranged to supply electric power to a first radio unit 302 of a network node 304 in a wireless network 306. A first optional action 400 illustrates that the power control unit 300 may obtain information about capacity of a power supply unit 308 which is used for supplying electric power at the network node 304. The capacity information obtained in this action may include a maximum power that the power supply unit 308 is capable to supply to the first radio unit 302. As indicated above, the power supply unit 308 may supply power to several radio units and other equipment in the network node at the same time, which means that the first radio unit 302 effectively shares the power supply unit 308 and its capacity with other power consumers so that the total capacity needs to be distributed amongst the power consumers. For example, if a new radio unit is added or an existing radio unit is removed, the power available for the first radio unit 302 may be reduced or increased, respectively. It may therefore be useful to perform action 400 at least occasionally.

A next action 402 illustrates that the power control unit 300 obtains a scheduled power demand related to an amount of electric power required in the first radio unit 302 for transmissions scheduled in an imminent time interval. In one example embodiment, the power control unit 300 may obtain the scheduled power demand from a scheduling function 304A which is operative to schedule said transmissions in resource elements of each time interval. In other example embodiments, the imminent time interval may be a resource block or a subframe in which said transmissions are scheduled to one or more wireless devices. The term imminent time interval could be replaced by impending, upcoming or next time interval.

In a following action 404, the power control unit 300 checks whether the obtained scheduled power demand exceeds a predefined power threshold or not. If it is found in action 404 that the power demand does not exceed the power threshold, electric power is supplied from a power supply unit 308 to the first radio unit 302 in an action 406, i.e. without employing the supplementary power source 310 which can therefore be disconnected from the first radio unit 302. On the other hand, if it is found in action 404 that the power demand exceeds the power threshold, electric power is supplied both from the power supply unit 308 and a supplementary power source 310 to the first radio unit 302 in an alternative action 408.

In more detail, action 406 may be performed by actively disconnecting the supplementary power source 310 to the first radio unit 302 in case it was used in the previous time interval, or by keeping the supplementary power source 310 disconnected from the first radio unit 302 in case it was not used also in the previous time interval. Correspondingly, action 408 may be performed by actively connecting the supplementary power source 310 to the first radio unit 302 in case it was not used in the previous time interval, or by keeping the supplementary power source 310 connected to the first radio unit 302 in case it was used also in the previous time interval.

After executing either action 406 or 408, the procedure may continue by repeating actions 402, 404 . . . for a next imminent time interval. Some further example embodiments that can be used in the procedure of FIG. 4 will now be described. In one example embodiment, the supplementary power source 310 may comprise a battery which is charged during periods when electric power is not supplied from the supplementary power source 310.

In another example embodiment, the power control unit 300 may adjust the power threshold based on a ratio of usage time when electric power has been supplied from the supplementary power source 310. When a battery is used in the supplementary power source 310, the latter embodiment may be useful to ensure that there is enough time to charge the battery so that it will not become drained too much when used. This embodiment may thus be applied by raising the power threshold if said ratio of usage time is high meaning that the supplementary power source 310 has been active for a relatively long time. Raising the power threshold will basically reduce the ratio of usage time. Conversely, the power threshold can be lowered if said ratio of usage time is low meaning that the supplementary power source 310 has been active for a relatively short time. Lowering the power threshold will basically increase the ratio of usage time.

In another example embodiment, the power supply unit 308 may be shared with one or more other radio units, which was also exemplified in FIG. 2 where three radio units 204A-C share the power supply unit 202. In another example embodiment, the power threshold may be set so that it does not exceed an available capacity of the power supply unit 308. It was explained above that the capacity available to the first radio unit 302 may be dependent on how much power is used by other power consumers, e.g. radio units, sharing the power supply unit 308.

When the supplementary power source 310 comprises a battery, another example embodiment may be that the battery comprises two or more segments that can be used and charged individually. Thereby, the capacity of the battery is flexible in that the number of segments in use can be adapted to the current power demand, while any segment(s) not in use can be charged instead. For example, the currently most charged segment(s) may be connected to the radio unit 302 while the other less charged segment(s) are being connected to the power supply unit 308 for charging. An example of this embodiment will be described later below with reference to FIG. 8.

In another example embodiment, the power control unit 300 may control the electric power from the supplementary power source 310 by connecting and disconnecting the supplementary power source 310 to/from the first radio unit 302, e.g. by operating a switch 310A arranged on a cable between the supplementary power source 310 and the first radio unit 302.

In another example embodiment, the first radio unit 302 may be located at the top of a tower and the power supply unit 308 may be located at the bottom of said tower, which was illustrated in FIGS. 2 and 3. In this case, another example embodiment may be that the supplementary power source 310 is located at the top of said tower, i.e. close to the first radio unit 302 which means that the feeding cable from the supplementary power source 310 can be relatively short to minimize energy losses.

Figure 5:
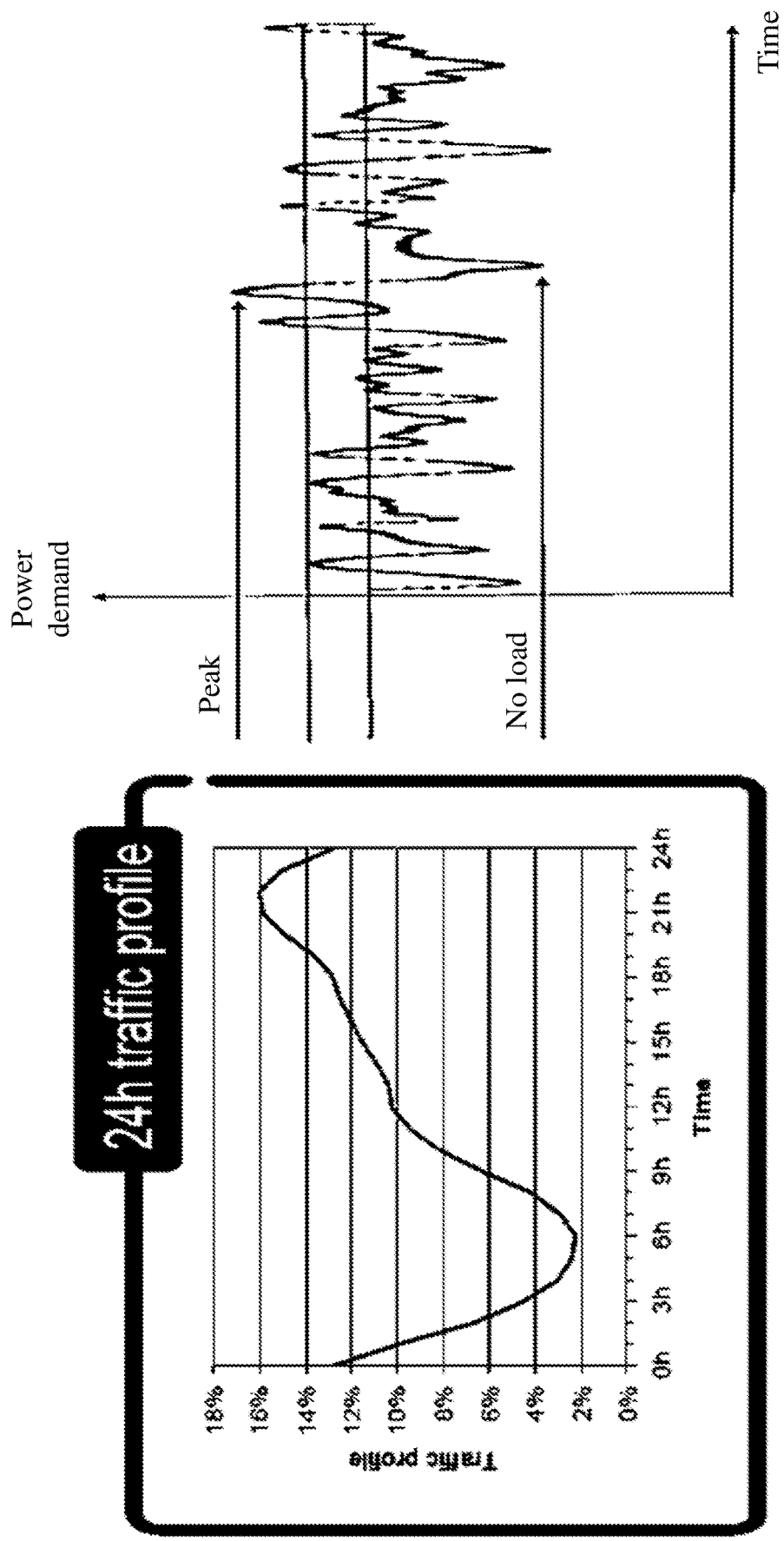
FIG. 5 is a diagram illustrating how the power demand in one or more radio units may vary over time in a wireless network.

It was mentioned above that the power demand typically varies greatly over time, e.g. depending on how much transmissions are performed which in turn is dependent on the intensity of ongoing communications, referred to as traffic. An example of this is illustrated in FIG. 5 which is a diagram with measurements of both how the traffic in a wireless network may vary over the 24 hours of a day and how the power demand in one or more radio units may fluctuate over a limited time period of a few milliseconds. It can be seen that the power required by the radio unit can change very rapidly between the maximum peak power and virtually no load. The above-described solution may be used to adapt the power supply instantaneously to such a fluctuating power demand in an efficient manner.

A more detailed example of how the procedure in FIG. 4 and some of its embodiments could be executed in practice will now be described with reference to the flow chart in FIG. 6. The actions in this figure can thus be performed by the above-described power control unit 300 to control supply of power to the first radio unit 302, and reference will again be made to FIG. 3. It is assumed that the supplementary power source 310 comprises a battery that needs to be charged now and then in order to work properly. A first action 600 illustrates that the power control unit 300 sets an initial power threshold, e.g. to a default value or the like which may have been determined based on previous usage of the power supply unit 308 and the supplementary power source 310 described herein.

Figure 4:
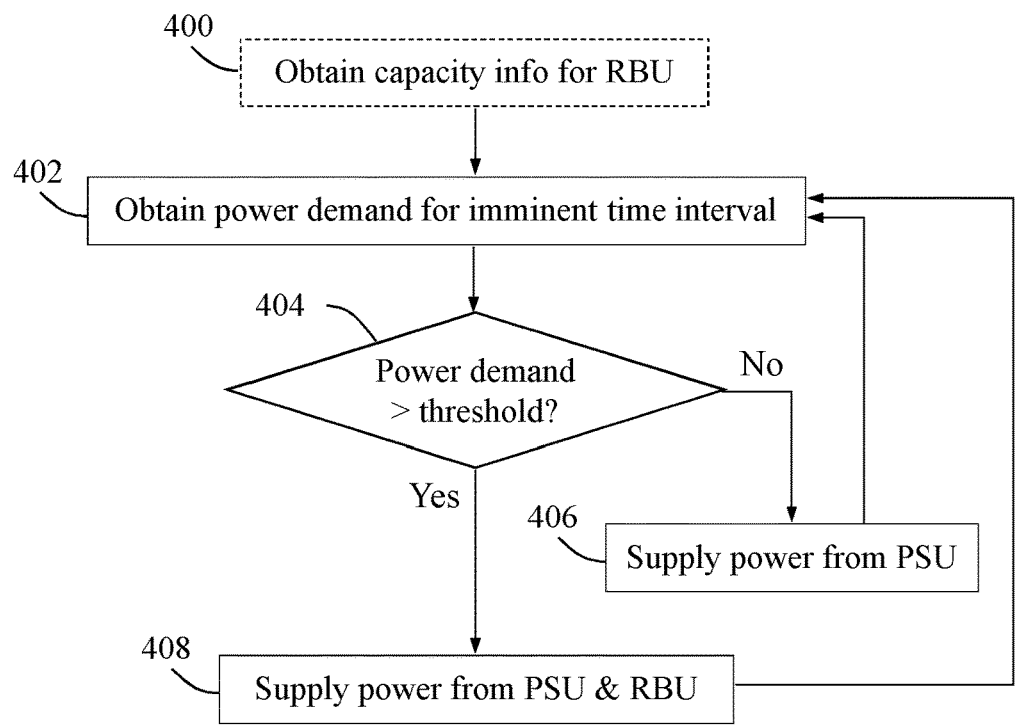
FIG. 4 is a flow chart illustrating a procedure in a power control unit, according to further example embodiments.

The following actions 602-608 are the same as actions 402-408 in FIG. 4 and they are thus performed in the manner described above. An additional action 610 illustrates that the power control unit 300 determines a ratio of usage time when electric power has been supplied from the supplementary power source RBU 310. The power control unit 300 then checks in an action 612 whether the ratio of usage time has changed significantly over time. If the change is large enough to motivate adjustment of the power threshold, the power control unit 300 accordingly adjusts the power threshold in an action 614. If the ratio of usage time has not changed significantly, action 614 is skipped and actions 602-612/614 are repeated for the next imminent time interval.

In more detail, if it is found in action 612 that the ratio of usage time has changed significantly, action 614 may be performed in such a manner that the ratio of usage time is restored to a desired level which may correspond to a charging time that is enough to keep the battery alive and working. It has been described above that adjusting the power threshold may include raising the power threshold if the ratio of usage time has increased, so that the ratio of usage time will be reduced, or alternatively lowering the power threshold if the ratio of usage time has decreased, so that the ratio of usage time will be increased. Thereby, a desired balance between usage time and charging time can be maintained for the battery or RBU 310.

Figure 7:
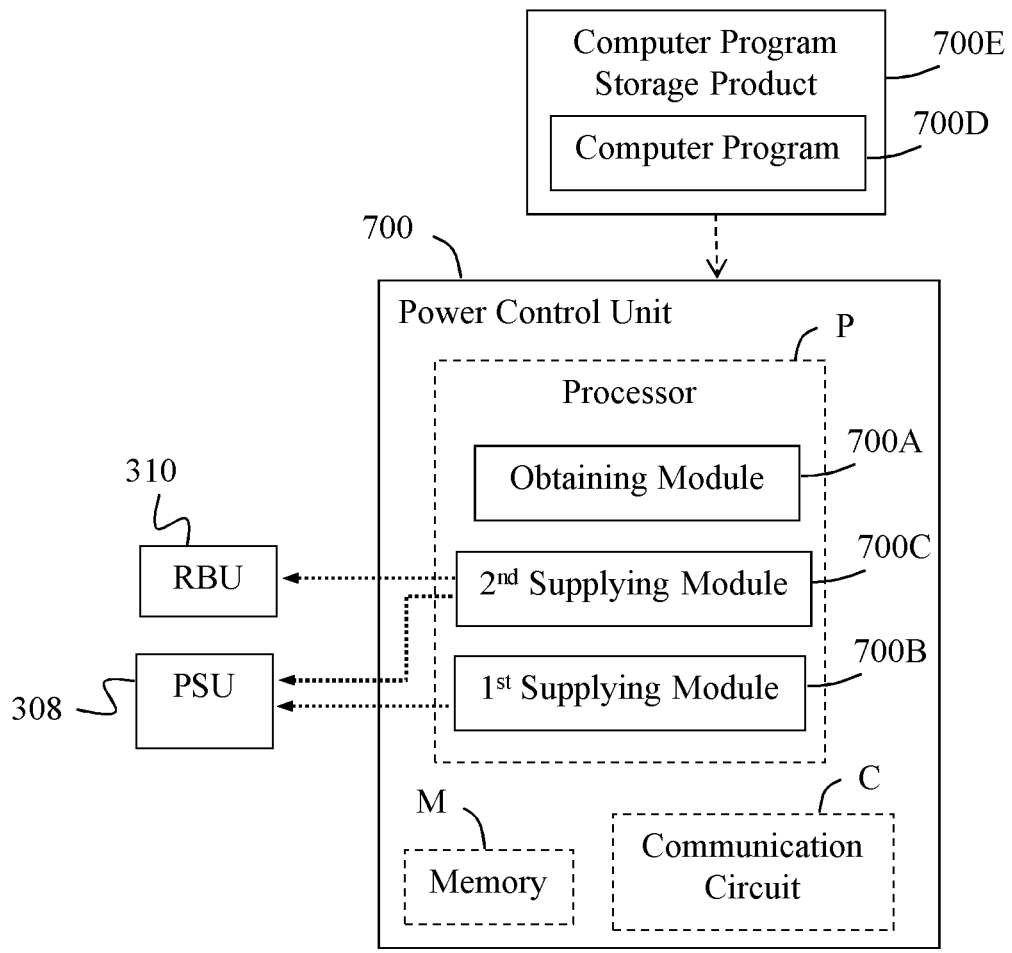
FIG. 7 is a block diagram illustrating how a power control unit may be structured to undertake any of the procedures described herein, according to further example embodiments.

The block diagram in FIG. 7 illustrates a detailed but non-limiting example of how a power control unit 700 may be structured to bring about the above-described solution and embodiments thereof. The power control unit 700 may be configured to operate according to any of the examples and embodiments of employing the solution as described above, where appropriate, and as follows. The power control unit 700 is shown to comprise a processor P and a memory M, said memory comprising instructions executable by said processor P whereby the power control unit 700 is operable as described herein. The power control unit 700 also comprises a communication circuit C with suitable equipment for receiving and transmitting signals in the manner described herein.

The communication circuit C may be configured for communication with a network controller and a cloud controller using suitable protocols depending on the implementation. The solution and embodiments herein are thus not limited to using any specific types of networks, technology or protocols for communication.

Figure 6:
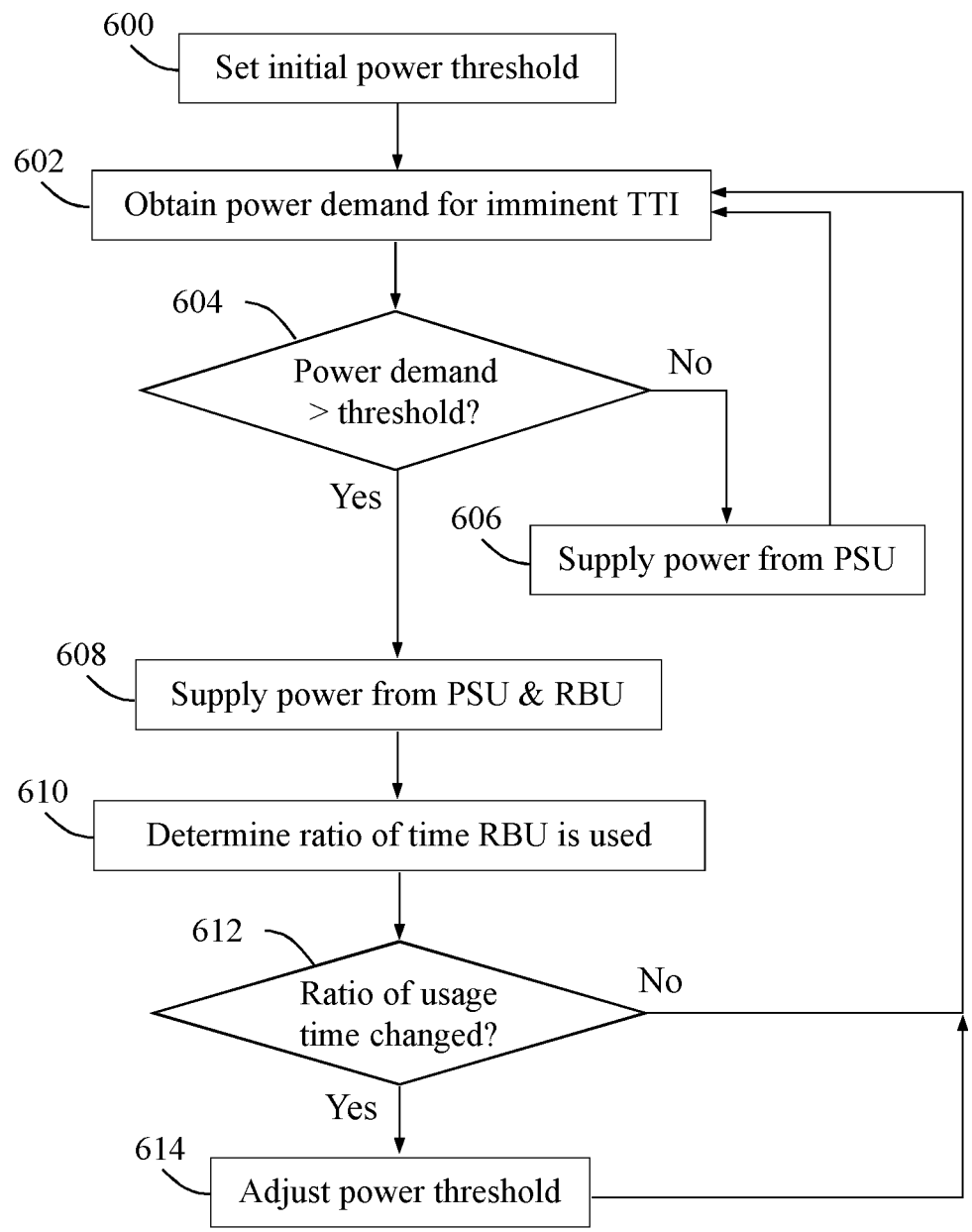
FIG. 6 is a flow chart illustrating an example of how a power control unit may operate in more detail, according to further example embodiments.

The power control unit 700 is operable to perform at least some of the actions in FIG. 4 and at least some of the actions in FIG. 6. The power control unit 700 is arranged or configured to supply electric power to a first radio unit of a network node in a wireless network.

The power control unit 700 is configured to obtain a scheduled power demand related to an amount of electric power required in the first radio unit for transmissions scheduled in an imminent time interval. This operation may be performed by an obtaining module 700A in the power control unit 700, e.g. in the manner described for action 402 above.

The power control unit 700 is also configured to supply electric power from a power supply unit 308 to the first radio unit, if the power demand does not exceed a power threshold. This operation may be performed by a first supplying module 700B in the power control unit 700, e.g. as described for action 406 above, also schematically indicated by a dotted arrow from the first supplying module 700B.

The power control unit 700 is further configured to supply electric power both from the power supply unit and a supplementary power source to the first radio unit, if the power demand exceeds the power threshold. This operation may be performed by a second supplying module 700C in the power control unit 700, e.g. as described for action 408 above, also schematically indicated by two respective dotted arrows from the second supplying module 700C.

It should be noted that FIG. 7 illustrates various functional modules or units in the power control unit 700, and the skilled person is able to implement these functional modules or units in practice using suitable software and hardware. Thus, the solution is generally not limited to the shown structures of the power control unit 700, and the functional modules 700A-C therein may be configured to operate according to any of the features and embodiments described in this disclosure, where appropriate.

The functional modules 700A-C described above can be implemented in the power control unit 700 by means of suitable hardware and program modules of a computer program comprising code means which, when run by the processor P causes the power control unit 700 to perform at least some of the above-described actions and procedures.

In FIG. 7, the processor P may comprise a single Central Processing Unit (CPU), or could comprise two or more processing units such as CPUs. For example, the processor P may include a general purpose microprocessor, an instruction set processor and/or related chip sets and/or a special purpose microprocessor such as an Application Specific Integrated Circuit (ASIC). The processor P may also comprise a storage for caching purposes.

A computer program 700D is also provided comprising instructions which, when executed on at least one processor, cause the at least one processor to carry out either of the methods described above. A carrier is further provided that contains the above computer program 700D, wherein the carrier comprises an electronic signal, an optical signal, a radio signal, or a computer program storage product 700E, the latter being shown in FIG. 7. For example, the computer program 700D may be stored on the computer program storage product 700E in the form of computer program modules or the like. The memory M may be a flash memory, a Random-Access Memory (RAM), a Read-Only Memory (ROM), an Electrically Erasable Programmable ROM (EEPROM) or hard drive storage (HDD), and the program modules could in alternative embodiments be distributed on different computer program products in the form of memories within the power control unit 700.

Finally, an example of how a battery with multiple segments may be employed in this solution, will now described with reference to FIG. 8. The battery in RBU 800 comprises multiple segments 800A that can be used and charged individually as follows. Power supply to a first radio unit 802 is controlled by a power control unit 804 which corresponds to the above-described power control unit 300. Power is thus supplied to the first radio unit 802 from a PSU 806 alone or from both the PSU 806 and the RBU 800 in the manner described above. To accomplish this, a switch 800B is controlled by the power control unit 804, as indicated by a dashed arrow, so that a suitable number of the segments 800A are connected to the first radio unit 802, and so that any segment(s) not in use are disconnected from the first radio unit 802 and instead connected to the PSU 806 for charging.

Thereby, the capacity of the battery is flexible in that the number of segments in use can be adapted to the current power demand, while any segment(s) not in use can be charged instead. For example, the currently most charged segment(s) may be connected to the radio unit 302 while the other less charged segment(s) are being connected to the power supply unit 308 for charging. An example of this embodiment.

While the solution has been described with reference to specific exemplifying embodiments, the description is generally only intended to illustrate the inventive concept and should not be taken as limiting the scope of the solution. For example, the terms "power control unit", "radio unit", "network node", "power supply unit", "supplementary power source", "time Interval", "power demand", "power threshold" and "scheduling function" have been used throughout this disclosure, although any other corresponding entities, functions, and/or parameters could also be used having the features and characteristics described here. The solution is defined by the appended claims.

The invention claimed is:

1. A method performed by a power control unit for supplying electric power to a first radio unit of a network node in a wireless network, where the first radio unit is located at the top of a tower, the method comprising:
   obtaining a scheduled power demand related to an amount of electric power required in the first radio unit for transmissions scheduled in an imminent time interval,
   supplying electric power from a power supply unit, located at the bottom of the tower, to the first radio unit if the power demand does not exceed a power threshold, and
   supplying electric power from the power supply unit, located at the bottom of the tower, and a supplementary power source, located at the top of the tower, to the first radio unit if the power demand exceeds the power threshold.

2. The method according to claim 1, wherein the imminent time interval is a resource block or a subframe in which said transmissions are scheduled to one or more wireless devices.

3. The method according to claim 1, wherein the power threshold is adjusted based on a ratio of usage time when electric power has been supplied from the supplementary power source.

4. The method according to claim 1, wherein the power threshold does not exceed an available capacity of the power supply unit.

5. The method according to claim 1, wherein the scheduled power demand is obtained from a scheduling function operative to schedule said transmissions in resource elements of each time interval.

6. The method according to claim 1, wherein the power supply unit is shared with one or more other radio units.

7. The method according to claim 1, wherein the supplementary power source comprises a battery which is charged during periods when electric power is not supplied from the supplementary power source.

8. The method according to claim 7, wherein the battery comprises two or more segments that can be used and charged individually.

9. The method according to claim 1, wherein the electric power from the supplementary power source is controlled by connecting and disconnecting the supplementary power source to/from the first radio unit.

10. A power control unit arranged to supply electric power to a first radio unit of a network node in a wireless network, where the first radio unit is located at the top of a tower, wherein the power control unit is configured to:
- obtain a scheduled power demand related to an amount of electric power required in the first radio unit for transmissions scheduled in an imminent time interval,
- supply electric power from a power supply unit, located at the bottom of the tower, to the first radio unit if the power demand does not exceed a power threshold, and
- supply electric power from the power supply unit, located at the bottom of the tower, and a supplementary power source, located at the top of the tower, to the first radio unit if the power demand exceeds the power threshold.

11. The power control unit according to claim 10, wherein the imminent time interval is a resource block or a subframe in which said transmissions are scheduled to one or more wireless devices.

12. The power control unit according to claim 10, wherein the power control unit is configured to adjust the power threshold based on a ratio of usage time when electric power has been supplied from the supplementary power source.

13. The power control unit according to claim 10, wherein the power threshold does not exceed an available capacity of the power supply unit.

14. The power control unit according to claim 10, wherein the power control unit is configured to obtain the scheduled power demand from a scheduling function operative to schedule said transmissions in resource elements of each time interval.

15. The power control unit according to claim 10, wherein the power control unit is operable when the power supply unit is shared with one or more other radio units.

16. The power control unit according to claim 10, wherein the supplementary power source comprises a battery and the power control unit is configured to charge said battery during periods when electric power is not supplied from the supplementary power source.

17. The power control unit according to claim 16, wherein the power control unit is operable when the battery comprises two or more segments that can be used and charged individually.

18. The power control unit according to claim 10, wherein the power control unit is configured to control the electric power from the supplementary power source by connecting and disconnecting the supplementary power source to/from the first radio unit.

19. A non-transitory computer-readable storage medium comprising a computer program product including instructions to cause at least one processor to:
- obtain a scheduled power demand related to an amount of electric power required in the first radio unit for transmissions scheduled in an imminent time interval, where the first radio unit is located at the top of a tower,
- supply electric power from a power supply unit, located at the bottom of the tower, to the first radio unit if the power demand does not exceed a power threshold, and
- supply electric power from the power supply unit, located at the bottom of the tower, and a supplementary power source, located at the top of the tower, to the first radio unit if the power demand exceeds the power threshold.

* * * * *

UNITED STATES PATENT AND TRADEMARK OFFICE
CERTIFICATE OF CORRECTION

PATENT NO. : 11,490,330 B2
APPLICATION NO. : 16/618430
DATED : November 1, 2022
INVENTOR(S) : Humla et al.

It is certified that error appears in the above-identified patent and that said Letters Patent is hereby corrected as shown below:

On the Title Page

In Column 2, delete "5 Drawings Sheets" and insert -- 6 Drawings Sheets --, therefor.

In the Drawings

In Figs. 1 & 2, delete "Sheet 1 of 5" and insert -- Sheet 1 of 6 --, therefor.

In Figs. 3 & 4, delete "Sheet 2 of 5" and insert -- Sheet 2 of 6 --, therefor.

In Fig. 5, delete "Sheet 3 of 5" and insert -- Sheet 3 of 6 --, therefor.

In Fig. 6, delete "Sheet 4 of 5" and insert -- Sheet 4 of 6 --, therefor.

In Fig. 7, delete "Sheet 5 of 5" and insert -- Sheet 5 of 6 --, therefor.

Figure 8:
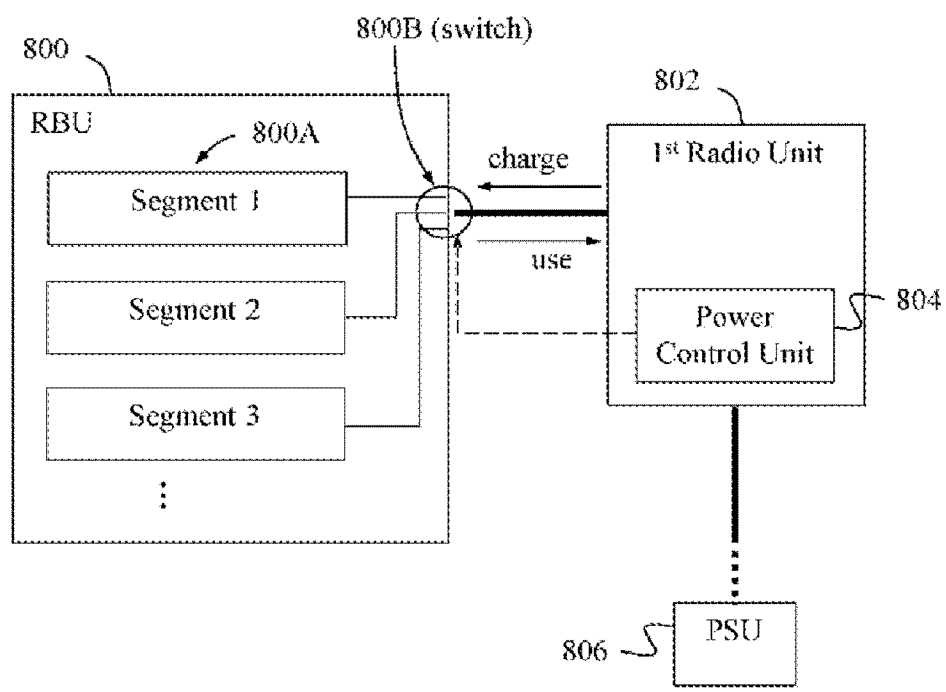
FIG. 8 is a block diagram illustrating how a battery may be arranged to enable flexible usage and charging, according to further example embodiments.

After Fig. 7, insert, Fig. 8, as shown on the attached drawing sheet.

In the Specification

In Column 2, Line 61, delete "operate," and insert -- operated, --, therefor.

In Column 5, Line 1, delete "base band (BB)" and insert -- baseband (BB) --, therefor.

In Column 5, Lines 59-60, delete "type with" and insert -- type of --, therefor.

In Column 9, Line 55, delete "hard drive storage (HDD)," and insert -- hard disk drive (HDD), --, therefor.

In Column 9, Lines 60-61, delete "now described" and insert -- now be described --, therefor.

Signed and Sealed this
Sixteenth Day of May, 2023

Katherine Kelly Vidal
*Director of the United States Patent and Trademark Office*

In Column 10, Lines 15-16, delete "charging. An example of this embodiment." and insert -- charging. --, therefor.

In the Claims

In Column 12, Line 24, in Claim 19, delete "the first radio unit" and insert -- a first radio unit --, therefor.